Patented Feb. 1, 1927.

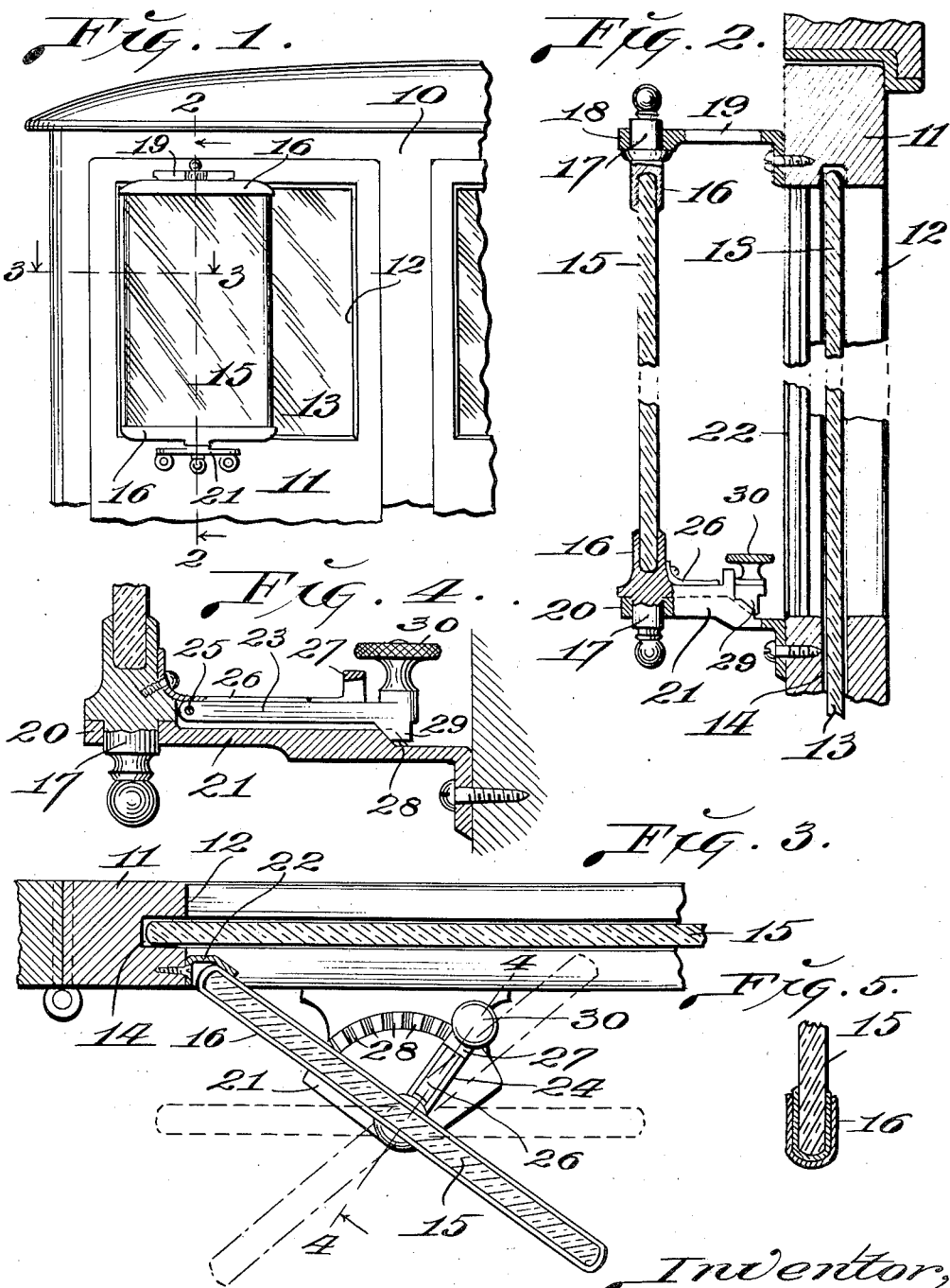

1,616,122

UNITED STATES PATENT OFFICE.

FREDERICK S. HERRIS, OF LOS ANGELES, CALIFORNIA.

WIND DEFLECTOR FOR MOTOR VEHICLES.

Application filed March 16, 1925. Serial No. 15,970.

My invention relates to a wind deflector that is especially designed for use on the doors of closed types of motor vehicles such as coupes, sedans, limousines or the like, and the principal objects of my invention are, to provide a wind deflector of relatively simple structure that may be easily and cheaply produced; to provide with simple and easily operated means whereby the deflector may be readily adjusted into different positions; to provide simple and efficient means for firmly securing the deflector in its differently adjusted positions and further, to provide a device of the character referred to, that presents a neat and finished appearance and which may be readily applied for use upon a motor vehicle door.

With the foregoing and other objects in view, my invention consists in certain novel features of construction and arrangement of parts that will be hereinafter more fully described and claimed and illustrated in the accompanying drawings in which:

Fig. 1 is a side elevational view of the front portion of a motor vehicle having a closed body and showing a deflector of my improved construction to the front door thereof.

Fig. 2 is an enlarged vertical section taken on the line 2—2 of Fig. 1.

Fig. 3 is an enlarged horizontal section taken on the line 3—3 of Fig. 1.

Fig. 4 is an enlarged detail section taken on the line 4—4 of Fig. 3.

Fig. 5 is a detail section showing a modified arrangement of mounting the glass panel of the deflector in one of the supporting frames.

Referring by numerals to the accompanying drawings which illustrate a practical embodiment of my invention, 10 designates the closed body of a motor vehicle, 11 the door thereof and which door is provided in its upper portion with an opening 12 that serves as a window. This opening is normally closed by a panel 13 of glass that is adapted to slide downwardly into a pocket 14 that is formed in the lower portion of the door.

The body of my improved wind deflector comprises a substantially rectangular panel 15 of glass that is supported between upper and lower channel members 16 of metal that are provided with centrally arranged vertically aligned trunnions 17. The trunnion 17 that projects upwardly from channel member 16 at the top of panel 15 is journalled in a bearing 18 that is formed on the outer end of a bracket 19 and the latter being secured in any suitable manner to the top rail of the door 11 immediately above the opening 12 therein.

Trunnion 17 that depends from the channel member 16 at the lower end of panel 15 is journalled in a bearing 20 that is formed in the outer end of a plate or bracket 21 and the latter being secured to the body of door 11 just below the lower edge of opening 12 therein.

The length of panel 15 and the channel members 16 at the ends thereof is substantially equal to the length of window opening 12 and the width of said panel is somewhat less than the width of said opening.

The length of the plates or brackets 19 and 21 is such that the bearings 18 and 20 which receive the trunnions are disposed some two or three inches away from the outer face of the door.

Thus, the deflecting panel 15 is mounted so as to swing upon a vertical axis that is outset from the outer face of the vehicle door and, when said panel is shifted so as to move its front edge against the door, said front edge bears against an angle plate 22 that is secured to the inner edge of that portion of the door frame that occupies a position at the front of opening 12.

The means utilized for adjusting the position of the deflecting panel and for locking same in its adjusted position comprises a short arm or lever 23 that occupies a position between parallel flanges 24 that project horizontally from the central portion of the lower channel member 16.

The rear or inner end of this arm is pivotally connected to the flanges 24 by a horizontally disposed pin 25 and secured to the lower channel member 16 and bearing on top of said arm 23, is a flat spring 26.

Formed on the forward or outer ends of flanges 24 is an inverted U-shaped keeper 27 that serves to limit the upward movement of the free end of arm or lever 23.

Formed on the upper face of lower bracket 21 and concentric with the axis formed by trunnions 17 is an arcuate row of notches 28 that are adapted to be engaged by a tooth or lug 29 that depends from the free arm 23 and projecting upwardly from the free end of said arm is a button 30 that is adapted to be engaged when the arm is lifted and swung in either direction over plate 21. Thus it will be seen that the pivoted arm or lever 23 provides simple and efficient means for swinging the deflecting panel from one position to another and when said arm or lever is released, the pressure of spring 26 on the top of said arm holds the tooth or lug 29 that depends from the front end of said arm, between two of the teeth 28, thereby firmly securing the panel in its adjusted position.

When the deflecting panel is positioned so that its front edge bears against angle plate 21, as seen by solid lines Fig. 3, the air or wind that impinges against the outer inclined face of said panel as the car moves forwardly will be deflected outwardly and when the deflector is adjusted so that its rear edge is positioned adjacent to the outer face of the door and, as shown by dot and dash lines, Fig. 3, the air or wind that strikes the inner face of the deflector will be deflected inwardly into the interior of the car body, providing of course, that the panel 13 is lowered into pocket 14.

Obviously, the deflecting panel may be adjusted and maintained in a neutral position or in a plane parallel with the door, as shown by dotted lines Fig. 3.

Thus it will be seen that I have provided a wind deflector for closed body motor vehicles that is relatively simple in structure, capable of being readily adjusted into various positions of use, firmly secured in its adjusted position and which deflector is very effective in performing its intended functions.

It will be understood that minor changes in the size, form and construction of the various parts of my improved wind deflector may be made and substituted for those herein shown and described without departing from the spirit of the invention, the scope of which is set forth in the appended claims.

I claim as my invention:

1. The combination with a motor vehicle door having a window opening, of brackets secured to the outer face of the door above and below the window opening therein, the lower one of the brackets being provided with an arcuate row of ratchet teeth, a wind deflector pivotally supported between said brackets and a manually operable latching member pivotally mounted on the lower portion of said deflector and adapted to engage the ratchet teeth to hold the deflector in differently adjusted positions.

2. The combination with a motor vehicle door having a window opening and an angle strip arranged on the outer face of the door at the front edge of the opening therein, of brackets secured to the outer face of said door above and below the opening therein, a wind deflector pivotally supported between said brackets, the front edge of which deflector is adapted to engage the angle strip when the front portion of the deflector is swung inwardly and cooperating means on the lower one of the brackets and the lower portion of the deflector for locking the latter in differently adjusted positions.

3. The combination with a motor vehicle door having a window opening, of brackets secured to the outer face of the door above and below the opening therein, the lower one of said brackets having an arcuate row of ratchet teeth, a wind deflector pivotally supported between said brackets, a manually operable locking finger pivotally secured to the lower portion of the deflector and adapted to engage the ratchet teeth to lock the deflector in differently adjusted positions, a spring for retaining the locking finger in engagement with the ratchet teeth and means for limiting the upward swinging movement of the latching finger.

4. The combination with a motor vehicle door having a window opening, of brackets secured to the outer surface of the door above and below the opening therein, a wind deflector pivotally supported between said brackets and manually operable means carried by the lower portion of said deflector and adapted to engage the lower one of the brackets for locking the deflector in differently adjusted positions.

In testimony whereof I affix my signature.

FREDERICK S. HERRIS.